United States Patent [19]

Lhospice

[11] 4,309,086
[45] Jan. 5, 1982

[54] NOSE PLATE HOLDER SPECTACLE FRAMES

[75] Inventor: Bernard Lhospice, Blois, France

[73] Assignee: Essilor International, Creteil, France

[21] Appl. No.: 118,986

[22] Filed: Feb. 6, 1980

[30] Foreign Application Priority Data

Feb. 22, 1979 [FR] France .................. 79 04528

[51] Int. Cl.³ .............. G02C 5/14; G02C 5/02; G02C 5/00
[52] U.S. Cl. .................. 351/140; 351/132; 351/111; 351/121
[58] Field of Search .......... 351/140, 111, 121, 131, 351/132, 136

[56] References Cited

FOREIGN PATENT DOCUMENTS 847794 7/1939 France .................. 351/111
2262317 6/1976 France .

Primary Examiner—John K. Corbin
Assistant Examiner—Rodney B. Bovernick
Attorney, Agent, or Firm—Burgess, Ryan and Wayne

[57] ABSTRACT

The invention relates to an improvement to spectacle frames, and is more particularly directed to a novel nose plate holder which comprises a fixing tab adapted to be attached to the spectacles, an upright member adapted to support the side members of the frame and having a length at least equal to twice the thickness of said side members, a substantially U-shaped bow portion having its open end directed downwardly, and a plate attaching member adapted to support the nose plate, said fixing tab, upright member, bow portion and plate attaching member being substantially disposed in line.

3 Claims, 3 Drawing Figures

NOSE PLATE HOLDER SPECTACLE FRAMES

The present invention is concerned with a nose plate holder for spectacle frames. It is also concerned with a spectacle frame provided with such nose plate holder. The invention is mainly related to spectacles having reduced overall dimensions.

One of the drawbacks of spectacles resides in their bulkiness when in the folded state. As a matter of fact, when in the folded condition, the sides, or side members, of the spectacle frame are located at a comparatively great distance from the face structure of the frame, and when the spectacles—whether protected or not by a spectacle-case—are placed in a pocket of the user's garments, the apparent or artificial volume occupied by such spectacles is an acute element of discomfort.

Arrangements for reducing the overall dimensions or bulkiness of spectacles have already been devised in the past, such arrangement being disclosed, for instance, in French patent application No. 74 06618 filed on Feb. 27, 1974.

According to the teaching of said prior patent application a snap device is provided and adapted to maintain the spectacle frame side members in a folded position so that they engage the face structure of the frame. The provision of said snap device involves a considerable increase of the manufacturing cost of the frame and makes it necessary specially to adapt the construction of the spectacle frame.

It is an object of the present invention to provide means which allow the above-mentioned drawbacks to be overcome. More particularly it is an object of the invention to provide an arrangement which allows any complementary device mounted on the frame with a view to maintaining the folded-in spectacle frame side members against the face structure of the frame to be dispensed with. It is also an object of the invention to provide such an arrangement without bringing about any prejudicial effect on the aesthetic aspect of the spectacle frame.

These and other objects of the invention are achieved by the provision of a nose plate holder for a spectacle frame, which comprises:

a fixing tab adapted to be attached to the spectacles, an upright member adapted to support the frame side members, the length of said upright member being at least equal to twice the thickness of the frame side members, a substantially U-shaped bow portion having its open end directed downwardly, a plate attaching member adapted to support the plate, said fixing tab, upright member, bow portion and plate attaching member being arranged in mutual alignment.

In a preferred embodiment the upright member is substantially perpendicular to the fixing tab.

A spectacle frame according to the present invention comprises a substantially planar face structure, two frame side members mounted on either side of the face structure and hingedly connected thereto so as to be pivotally movable between an unfolded or active position and a folded or rest position wherein said frame side members are folded onto said face structure and superimposed to each other, and two nose plate holders attached to the face structure and adapted to support a pair of nose plates, each one of said holders comprising:

a fixing tab attached to the structure of the frame, an upright member extending substantially perpendicularly to the face structure over a length at least equal to twice the tickness of each frame side member, said upright member being integrally connected to a substantially U-shaped bow portion the open end of which is directed toward the lower end of said face structure, the free end of said bow portion supporting the nose plate attaching member, said holder defining between said bow portion and the face structure of the frame a space adapted to receive the two superimposed frame side members in the rest position thereof, and to maintain said side members temporarily in said rest position.

The frame side members preferably have a thickness which is substantially constant over the major part of their length.

The invention will be described herein-after in a more detailed manner with reference to the appended drawing which is given by way of illustration but not of limitation. In the drawing.

Figure 1:
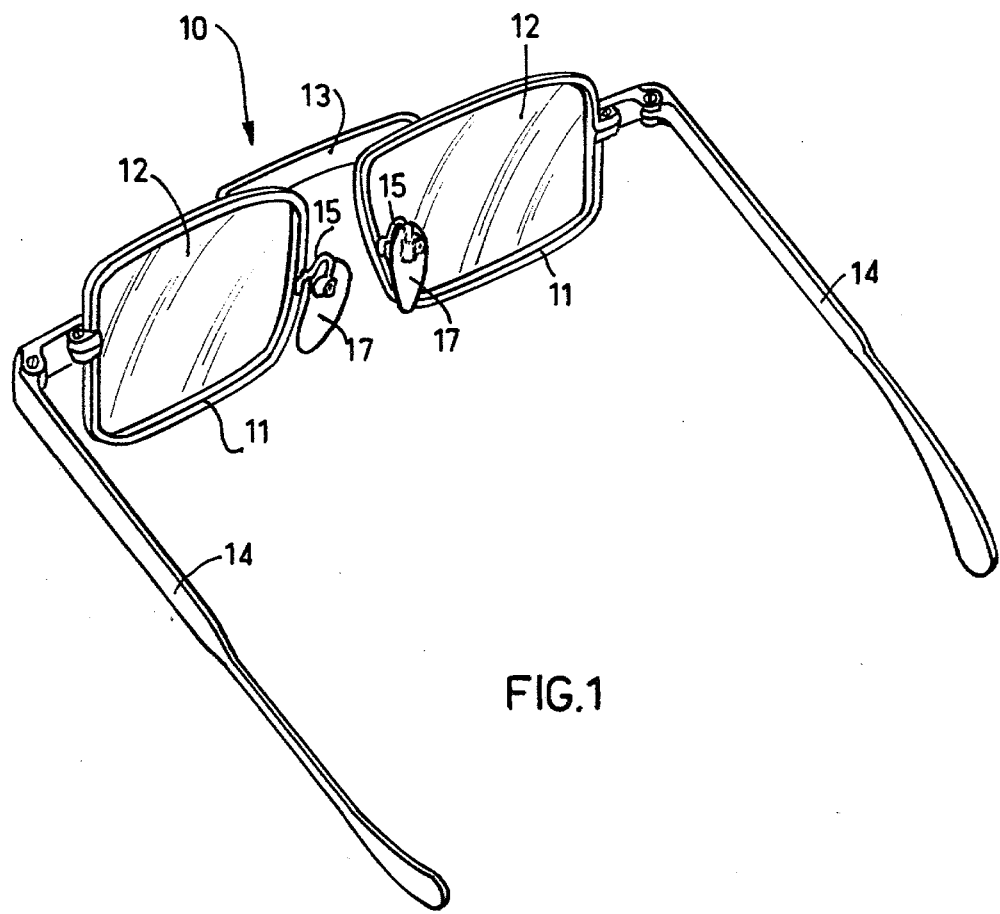
FIG. 1 is a general perspective view of a spectacle frame according to the present invention.
Figure 3:
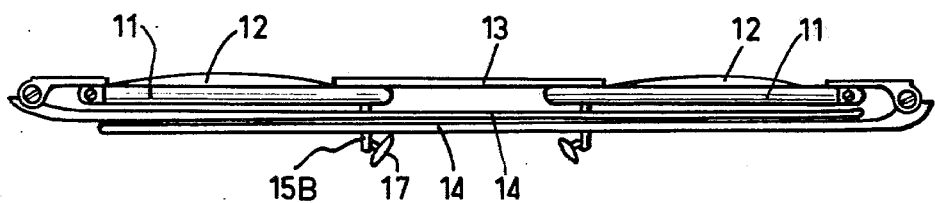
FIG. 3 shows the spectacle frame according to the invention, as viewed from above, the frame side members being in the folded position and maintained against the face structure of the frame.
Figure 2:
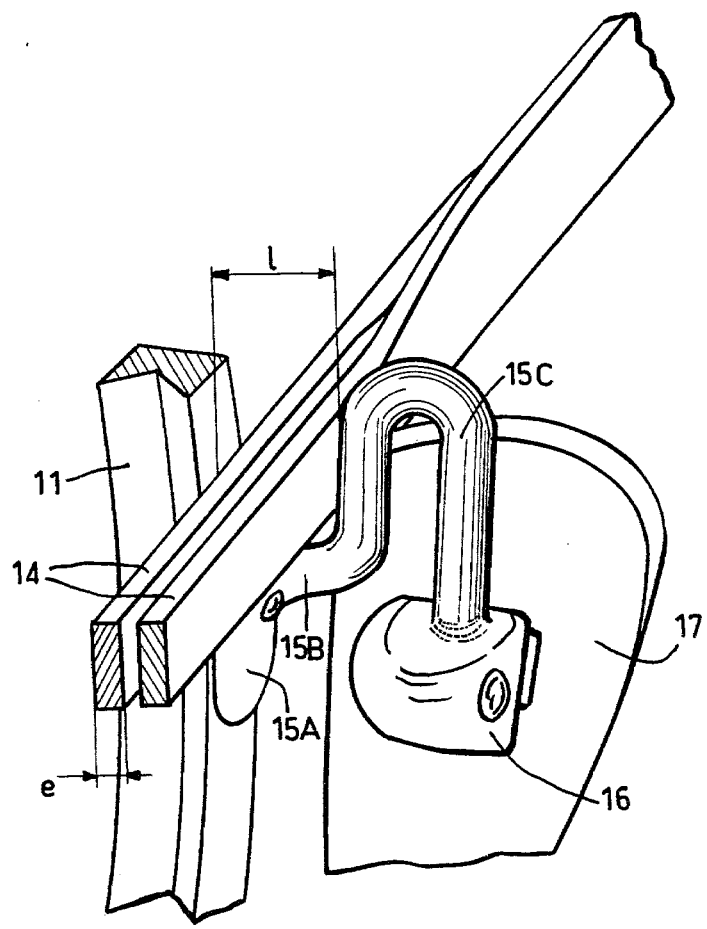
FIG. 2 illustrates a detail showing in particular a nose plate holder according to the invention.

As shown in FIG. 1, a spectacle frame 10 comprises two separate glass encircling members, or rims, 11 each of which is adapted to receive an ophthalmic glass or lens having a conveniently shaped periphery.

According to one known technique, glasses or lenses 12 are mounted in rims 11 by forcibly engaging the lenses in the latter.

According to another known technique, the rims are split and provided with locking means such as screws or the like adapted to fix the rims onto the periphery of the lenses so as to hold the latter in place.

A bridge member 13 connects rims 11 to each other.

The face structure properly speaking of the spectacle frame is constituted by these two rims 11 mutually connected by bridge member 13.

A frame side member 14 is hingedly connected to each rim 11. The connection between each side member 14 and the face structure is obtained by a screw hinge type articulation known per se which needs not to be described in detail here.

Preferably side members 14 have a substantially constant thickness over the greatest part of their length.

A nose plate holder 15 is attached by welding or any other convenient means to the frame face structure, and, more particularly, in practice to each one of rims 11. A nose plate attaching member 16 adapted to hold a nose plate 17 is mounted to the end of holder 15.

Nose plate holder 15 comprises a fixing tab 15A, an upright member 15B extending substantially perpendicularly to the face structure of the spectacle frame over a length 1 which is at least substantially equal to the thickness e of each side member 14.

This upright member 15B is extended by a bow portion 15C which is substantially U-shaped and has its open end directed downwardly, i.e. toward the lower portion of the spectacle frame face structure.

The above-mentioned nose plate attaching member 16 is mounted on the free end of bow portion 15C.

Thus the nose plate holder 15 defines between the frame face structure and the bow portion 15 a free space into which the two frame side members 14 can be introduced in a superimposed position. Introducing the two side members 14 into said space is a particularly simple operation.

Side members 14 are folded toward the frame face structure while a pressure is exerted on said branches so as to move them into engagement with the face structure or the rims 11.

In this position side members 14 are located above the space defined by each nose plate holder 15 between its bow portion 15C and the face structure of the spectacle frame.

The user then only needs exert on side members 14 a pressure directed toward the lower portion of the frame face structure for inserting the side members into the above-mentioned spaces.

Side members 14 have a reduced thickness e, as compared to their length L and have consequently a sufficiently high elasticity so as to be able to be deformed temporarily and inserted between the frame face structure and bow portions 15C of holders 15 without any risk of deterioration of the side members or the associated hinge connections.

It will be easily understood that the invention as described herein-above applies to metallic spectacle frames as well as to spectacle frames made of plastic material.

The invention is not limited to the features shown in the drawing and set forth in the above description. Many modifications and variants can be envisaged by those skilled in the art without departing from the spirit and scope of the invention as defined in the appended claims.

What is claimed is:

1. A nose plate holder for a spectacle frame comprising a face structure and two hinged frame side members, said nose plate holder comprising:

a fixing tab attached to the face structure;

an upright member extending substantially perpendicularly to the face structure over a length at least equal to the thickness of each frame side member, said upright member being integrally extended by a substantially U-shaped bow portion having its open end directed toward the lower position of said face structure;

a plate attaching member supported by the free end of said bow portion, said nose plate holder defining between said bow portion and the face structure of the spectacle frame a space adapted to receive and maintain temporarily said side members in a folded position wherein they are naturally superimposed against the face structure.

2. In a spectacle frame comprising a substantially planar face structure, tow frame side members mounted on either side of said face structure and hingedly connected thereto so as to be angularly movable between an unfolded active position and a folded rest position wherein they are superimposed and engage said face structure, and two nose plate holders fixed on said face structure, each one being adapted to support a nasal plate thereon, the improvement which comprises each nose plate holder comprising a fixing tab attached to the face structure, an upright member extending substantially perpendicularly to the face structure over a length at least equal to the thickness of each frame side member, said upright member being integrally extended by a substantially U-shaped bow portion having its open end directed toward the lower portion of said face structure, the free end of the said bow portion supporting a plate attaching member, said nose plate holder defining between said bow portion and the face structure of the spectacle frame a space adapted to receive said two side members in their rest position wherein they are mutually superimposed, and adapted to allow said side members to be temporarily maintained in said rest position.

3. The spectacle frame of claim 2, wherein said side members have preferably a thickness which is substantially constant over the greatest part of their length.

* * * * *